(12) United States Patent
Eguchi

(10) Patent No.: US 9,639,078 B2
(45) Date of Patent: May 2, 2017

(54) TANDEM POSITION CONTROL DEVICE

(71) Applicant: OKUMA Corporation, Niwa-gun, Aichi (JP)

(72) Inventor: Satoshi Eguchi, Aichi (JP)

(73) Assignee: OKUMA CORPORATION, Aichi (JP)

( * ) Notice: Subject to any disclaimer, the term of this patent is extended or adjusted under 35 U.S.C. 154(b) by 0 days.

(21) Appl. No.: 15/072,865

(22) Filed: Mar. 17, 2016

(65) Prior Publication Data

US 2016/0274563 A1    Sep. 22, 2016

(30) Foreign Application Priority Data

Mar. 19, 2015  (JP) ................................ 2015-056945

(51) Int. Cl.
  *H02P 5/00*      (2016.01)
  *G05B 19/19*     (2006.01)
  *H02P 5/747*     (2006.01)

(52) U.S. Cl.
  CPC .... *G05B 19/19* (2013.01); *G05B 2219/42062* (2013.01); *H02P 5/747* (2013.01)

(58) Field of Classification Search
  CPC ............ G05B 2219/33337; G05B 2219/42256; G05B 19/19; G05B 2219/42062; F16H 61/448; H02P 6/08; H02P 5/50; H02P 5/00
  USPC .......................................................... 318/34
  See application file for complete search history.

(56) References Cited

U.S. PATENT DOCUMENTS

| | | | | |
|---|---|---|---|---|
| 5,646,495 A | * | 7/1997 | Toyozawa | G05B 19/19 318/6 |
| 6,184,644 B1 | * | 2/2001 | Eguchi | G05B 19/404 318/624 |
| 2001/0028228 A1 | | 10/2001 | Toyozawa et al. | |
| 2003/0111973 A1 | * | 6/2003 | Iwashita | G05B 19/19 318/625 |
| 2007/0007926 A1 | * | 1/2007 | Iwashita | G05B 19/4141 318/625 |

(Continued)

FOREIGN PATENT DOCUMENTS

JP    2001-273037 A    10/2001

*Primary Examiner* — Bentsu Ro
*Assistant Examiner* — Gabriel Agared
(74) *Attorney, Agent, or Firm* — Cantor Colburn LLP

(57) ABSTRACT

A position control device for driving one control target, using two drive shafts, has position control units provided to the respective drive shafts. Each position control unit includes a calculation unit for calculating a torque command value before compensation, a deflection vibration reduction torque compensator for calculating a deflection torque estimate and calculating a deflection vibration reduction torque compensation amount, based on the deflection torque estimate and a deflection vibration reduction compensation gain, and a compensator gain calculation unit for outputting, upon receipt of a tandem control command, to the deflection vibration reduction torque compensator, a signal for outputting the deflection vibration reduction torque compensation amount and calculating the deflection vibration reduction compensation gain, and the each of the position control units outputs a value obtained by adding the deflection vibration reduction torque compensation amount to the torque command value before compensation as the torque command value.

2 Claims, 12 Drawing Sheets

(56) References Cited

U.S. PATENT DOCUMENTS

| | | | | |
|---|---|---|---|---|
| 2008/0169778 A1* | 7/2008 | Eguchi | ................ | G05B 13/042 |
| | | | | 318/561 |
| 2008/0218116 A1* | 9/2008 | Maeda | ................... | G05B 19/19 |
| | | | | 318/571 |
| 2008/0297094 A1* | 12/2008 | Ooga | .................... | B25J 9/1628 |
| | | | | 318/632 |
| 2015/0378347 A1* | 12/2015 | Sato | .................. | G05B 19/4063 |
| | | | | 700/193 |

* cited by examiner

TANDEM POSITION CONTROL DEVICE

CROSS-REFERENCE TO RELATED APPLICATIONS

The present invention claims priority under 35 U.S.C. §119 to Japanese Application No. 2015-056945, filed on Mar. 19, 2015, the entire content of which is incorporated herein by reference.

BACKGROUND OF THE INVENTION

Field of the Invention

The present invention relates to a servo control device for controlling a shaft of an arm or the like of a machine tool or a robot, and in particular to tandem control for controlling one control target, using two motors.

Description of the Related Art

In a drive mechanism of a machine tool, a robot, or the like, when a control target, or a moving unit, is so large that a torque (a thrust force in the case of a linear motion type) of a single motor for driving a shaft of the moving unit is insufficient, tandem control may be executed by giving a command to two motors to drive a single control target, using two motors. In the tandem control state, respective motors (a rotation type or a linear type) drive one control target in a rotation direction or a linear motion direction via a gear or a coupling element.

FIG. 8 is a schematic diagram showing a target plant in the form of a rotating motor shaft in the tandem control state. Note here that an inertia moment of a drive shaft 1 and a drive shaft 2 including two motors and a control target is expressed as being divided into I1 and I2, and deflection caused between the drive shaft 1 and the drive shaft 2 is expressed by a spring system with rigidity K. The respective positions of the drive shaft 1 and the drive shaft 2 are indicated by x1, x2, a disturbance torque is denoted as τdis, and respective generated torques as τ1, τ2.

An equation of motion in the case of driving the target plant shown in FIG. 8 under tandem control is expressed as expressions (1) and (2).

[Expression 1]

$$I_1 \dot{v}_1 + \Sigma_r = \tau_{dis} \quad (1)$$

$$I_2 \dot{v}_2 - \tau_r = \tau_2 + \tau_{dis} \quad (2)$$

wherein the respective velocities of the drive shaft 1 and the drive shaft 2 are denoted as v1, v2, and a deflection torque τr is expressed as an expression (3).

[Expression 2]

$$\tau_r = K(x_1 - x_2) \quad (3)$$

FIG. 9 is a block diagram showing an equation of motion of a target plant in the tandem control state.

FIG. 10 is one example of a block diagram of a conventional position control device 300 for controlling the positions x1, x2 of a target plant in the tandem control state according to a position command value X generated as a function for every constant period by an upper-level device (not shown). A first shaft position control unit 100a controls the drive shaft 1, and a second shaft position control unit 100b controls the drive shaft 2. In the description below, for each of the members having the same function each provided for every shaft, either a (first shaft) or b (second shaft) is added to the end of the reference numeral thereof. In the following, an operation of the conventional position control device 300 shown in FIG. 10 will be described.

Initially, the first shaft position control unit 100a will be described. According to the conventional art, a feedforward structure is employed in order to achieve high speed response to a command. Specifically, an acceleration/deceleration processing unit 50a executes acceleration/deceleration processing for appropriate acceleration or derivative of acceleration with respect to a position command value X to output a position command value Xc subjected to such acceleration/deceleration processing. The position command value Xc is subjected to time differentiation in a differentiator Ma thereby giving a velocity feedforward amount VF, and further subjected to time differentiation in the differentiator 55a thereby giving an acceleration amount command value AF. An amplification rate ATF1 of an amplifier ATF1 is a constant for obtaining an acceleration/deceleration torque feedforward amount τF1 corresponding to a motor torque that accelerates the target plant 200 shown in FIG. 8 by an acceleration amount AF.

The feedback structure is formed as described below. That is, using the position x1 of the drive shaft 1, detected by a position detector (not shown), as a position feedback, a subtractor unit 51a subtracts from the position command value Xc to output a position error, which is amplified by a position error amplifier Kp1. An output from the position error amplifier Kp1 is added to the velocity feedforward amount VF in an adder unit 52a thereby giving a velocity command value V1.

The subtractor unit 53a subtracts a velocity v1 obtained by differentiating the position x1 in a differentiator 56a from the velocity command value V1 to output a velocity error, which is then generally subjected to proportional integral amplification in a velocity error amplifier Gv1. An output from the velocity error amplifier Gv1 is added to the acceleration/deceleration torque feedforward amount τF1 in an adder unit 57a to be outputted from the first shaft position control unit 100a.

The second shaft position control unit 100b will not be described here as the inside structure and structural elements thereof are the same as those of the first shaft position control unit 100a. Note that in the tandem control state, the first shaft position control unit 100a and the second shaft position control unit 100b are given a common position command value X from an upper-level device (not shown), and the position command value Xc subjected to acceleration/deceleration processing needs to be common, which means that operations of the acceleration/deceleration processing unit 50a and of the acceleration/deceleration processing unit 50b are the same.

The subtractor unit 58 subtracts the velocity v2 of the drive shaft 2 from the velocity v1 of the drive shaft 1 to output a velocity difference (hereinafter referred to as a deflection velocity). The deflection velocity is amplified by Gd times by an amplifier Gd thereby giving a torque feedback τb. The torque feedback τp is then subtracted from the torque command value, or an output from the first shaft position control unit 100a, in the subtractor unit 59 thereby giving a torque command value τ1 relative to the drive shaft 1 of the position control device 300. In addition, the torque feedback τp is added to the torque command value, or an output from the second shaft position control unit 100b, in an adder unit 60 thereby giving a torque command value τ2 relative to the drive shaft 2 of the position control device 300.

With this structure, the torque command value is corrected so as to reduce generation of deflection. In this case, the torque feedback τp has an effect of reducing vibration due to torque interference between the drive shaft 1 and the drive shaft 2. While I1=0.3 [kg·m2], I2=0.1 [kg·m2], and K=50·103 [Nm/rad] are selected as a target plant condition, preferable control condition (Kp*, Gv*, ATF*: *=1 or 2) is set for this target plant, and a disturbance torque τdis shown in FIGS. 8 and 9 is given in a stepwise manner, and a disturbance response is simulated for every period TS=0.1 [ms]. The result of simulation is shown in FIGS. 11 and 12.

The upper graph in FIG. 11 shows the disturbance torque τdis. With stepwise disturbance of +100 [Nm] given at the time of 10 ms, deflection results between the drive shaft 1 and the drive shaft 2 shown in FIG. 8. The lower graph in FIG. 11 shows the velocity v1 of the drive shaft 1 generated due to stepwise disturbance. The upper graph in FIG. 12 shows the velocity v2 of the drive shaft 2, and the lower graph shows the position error Diff1 (=Xc−x1) of the drive shaft 1.

It is known from FIGS. 11 and 12 that a vibration characteristic of disturbance response significantly varies depending on the amplification rate Gd of the amplifier Gd. With Gd=0→Gd=70 set, torque feedback τp is generated, and damping characteristic is improved. However, with Gd=70→Gd=200 set, damping characteristic becomes excessive, which deteriorates response characteristic. This means that there is a preferable amplification rate Gd, depending on a target plant condition.

Note here that by including deflection velocity detection between control shafts and torque feedback control by the amplifier Gd (hereinafter additionally using the term of torque compensation control) in the equations of motion, namely, the expressions (1), (2), and (3), transmission characteristic of the deflection torque τr relative to the disturbance torque τdis is expressed as an expression (4).

[Expression 3]

$$\frac{\tau_r(s)}{\tau_{dis}(s)} = -\frac{\omega_p^2}{s^2 + G_d\left(\frac{1}{I_1} + \frac{1}{I_2}\right)s + \omega_p^2}; \omega_p = \sqrt{K\left(\frac{1}{I_1} + \frac{1}{I_2}\right)} \quad (4)$$

As this characteristic is of a secondary lag system, vibration characteristic can be expressed as an expression (5), using an attenuation coefficient ζ.

[Expression 4]

$$\zeta = \frac{G_d}{2K}\omega_p \quad (5)$$

That is, in order to achieve both an appropriate damping characteristic and a response characteristic, it is necessary to select the amplification rate Gd so as to achieve the attenuation coefficient ζ=0.5 to 0.8, depending on the target plant condition.

The conventional position control device shown in FIG. 10 is premised on a structure capable of simultaneous detection of the velocity v1 of the drive shaft 1 and the velocity v2 of the drive shaft 2 and real time calculation of the deflection velocity. However, according to a typical position control device, it is often a case that the first shaft position control unit and the second shaft position control unit are independently formed, and in such a structure, it is not possible on one control shaft side to simultaneously detect on a real time basis the velocity of its own shaft and that of the other shaft. Therefore, it is not possible to execute torque compensation control using a deflection velocity between control shafts relative to a target plant in the tandem control state.

Further, in the case where the condition of a target plant in the tandem control state is constant or varies only slightly, such as is in tandem driving of a feed shaft of a machine tool, it is possible to select an amplification rate Gd in advance while checking vibration characteristic. However, in a case where a workpiece is held on both end portions thereof by two respective main shafts positioned on the opposite sides relative to each other and subjected to turning processing, the workpiece is shifted from being in an independent control state to the tandem control state in which torque interference is caused between shafts, shown in FIG. 8, at the time when one main shaft placed on the opposite side relative to the other main shaft holding one end portion of the workpiece grasps the other end portion of the workpiece.

In such an operation, the target plant condition (inertial moments I1, I2 of the respective shafts and the rigidity K in the tandem control state) varies significantly depending on the material or shape of the workpiece. Therefore, even though the amplification rate Gd is selected in advance, the attenuation coefficient ζ resultantly deviates significantly from an appropriate value once the workpiece is changed to another, and accordingly it is not possible to achieve tandem control with preferable damping characteristic and response characteristic.

In view of the above, the present invention aims to provide a position control device appropriate for tandem driving and capable of promptly achieving torque compensation control with preferable attenuation characteristic even in a position control device including independently formed first and second shaft position control units and incapable of torque compensation control using a deflection velocity between control shafts or in an operation in which the independent control state and the tandem control state are repetitively switched and the target plant condition thus varies significantly.

SUMMARY OF THE INVENTION

In the tandem control state, generally, a deflection torque it is calculated through estimation. In particular, at the time of shifting to the tandem control state, the rigidity K is calculated based on the velocity of the other shaft, transferred from an upper-level device (not shown), the velocity of its own shaft and the deflection torque estimated at the same time as estimation of the velocity of the other shaft, to set a compensator gain for a deflection vibration reduction torque compensator that gives an appropriate attenuation coefficient ζ to tandem control response.

With the above, a torque command value including a deflection vibration reduction torque compensation amount added is obtained, and accordingly, it is possible to achieve tandem control with preferable damping characteristic and response characteristic with an appropriate attenuation coefficient ζ, depending on a target plant condition that varies significantly.

According to a position control device according to the present invention, it is possible to promptly achieve tandem control capable of torque compensation control with preferable attenuation characteristic at the time of shifting to the tandem control state even in a structure including independently formed first and second shaft position control units and incapable of torque compensation control using a deflection velocity between control shafts, or in the case where the independent control state and the tandem control state are repetitively switched and the target plant condition thus varies significantly.

DETAILED DESCRIPTION OF THE INVENTION

Figure 1:
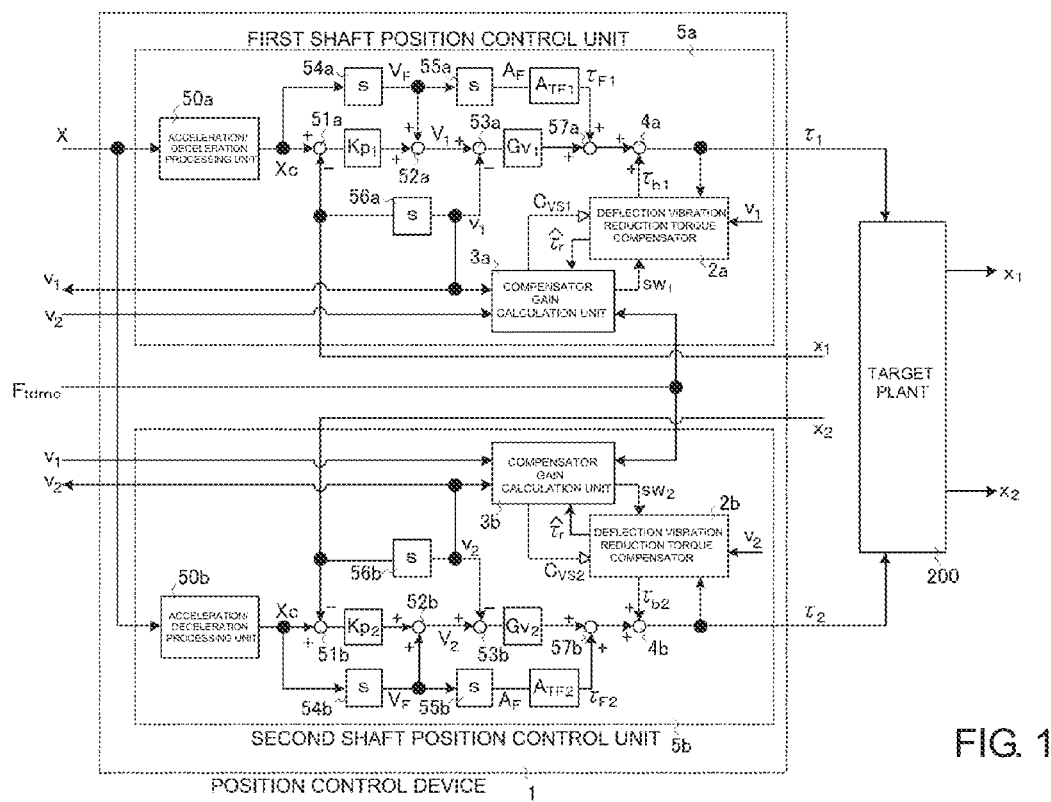
FIG. 1 is a block diagram showing an example of a structure of a position control device according to the present invention.

In the following, an embodiment of the present invention will be described referring to an example (hereinafter referred to as an embodiment). FIG. 1 is a block diagram showing one example of a position control device according to the present invention. In the following, only a difference from the above described conventional art will be described. This position control device is premised on a structure in which a first shaft position control unit and a second shaft position control unit are independently formed and the velocities of the respective shafts cannot be simultaneously detected on a real time basis.

Below, a first shaft position control unit 5a will be described. A second shaft position control unit 5b will not be described as the inside structure and structural elements thereof are the same as those of the first shaft position control unit 5a. Each of the shaft position control units 5a, 5b roughly includes a calculation unit for calculating a torque command value before compensation (an output value from the adder unit 57a, 57b), a deflection vibration reduction torque compensator 2a, 2b, and a compensator gain calculation unit 3a, 3b. Physically, the shaft position control unit 5a, 5b includes a CPU for various operations and a memory for storing various control parameters and a detected value. The deflection vibration reduction torque compensator 2a applies a damping characteristic to a target plant to reduce vibration. In the position control device according to the present invention, as real time detection of a deflection velocity is not possible, a deflection torque τr is estimated, and a deflection vibration reduction torque compensation amount τb1 is calculated based on the deflection torque τr estimated.

Figure 2:
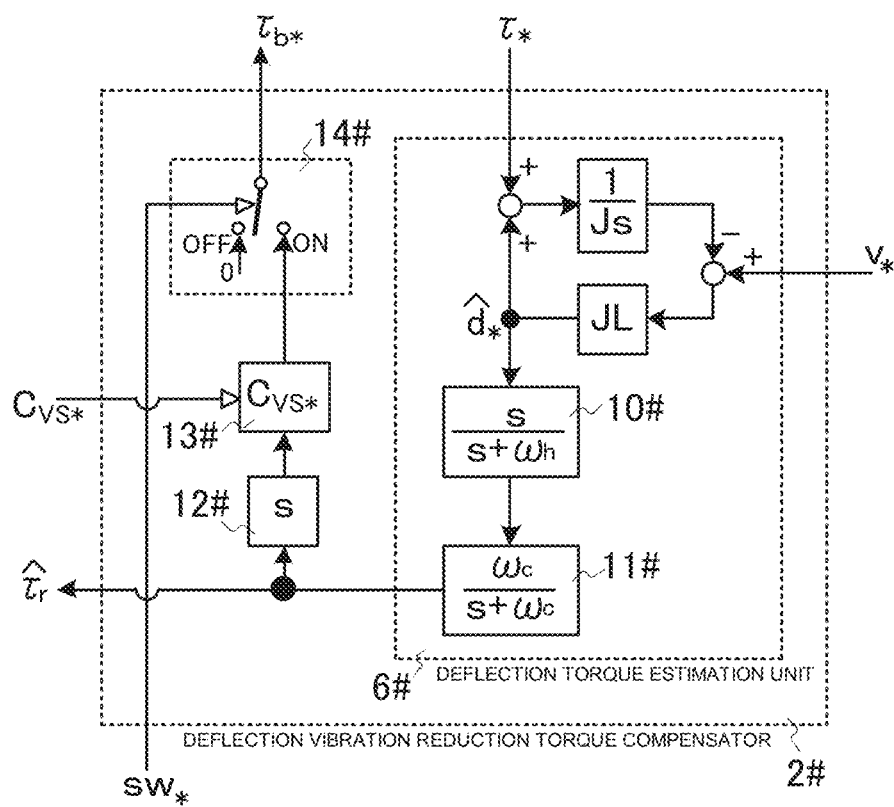
FIG. 2 is a block diagram showing an example of a structure of a deflection vibration reduction torque compensator provided inside a position control device according to the present invention.

FIG. 2 is a block diagram showing an example of a structure of the deflection vibration reduction torque compensator 2# (# indicates either a or b). ˆd* in the diagram is expressed as an expression (6) relative to an input τ*, v* (* indicates either 1 or 2).

[Expression 5]

$$\hat{d}_*(s) = \frac{L}{s+L}\{J \cdot sv_*(s) - \tau_*(s)\} \tag{6}$$

wherein J refers to an inertia moment identified using a publicly known technique with respect to each of the drive shafts 1 and 2 in the independent control state. Specifically, the inertial moment I1 of the drive shaft 1 is applied in the deflection torque estimation unit 6a, and the inertial moment I2 of the drive shaft 2 is applied in the deflection torque estimation unit 6b.

Figure 9:
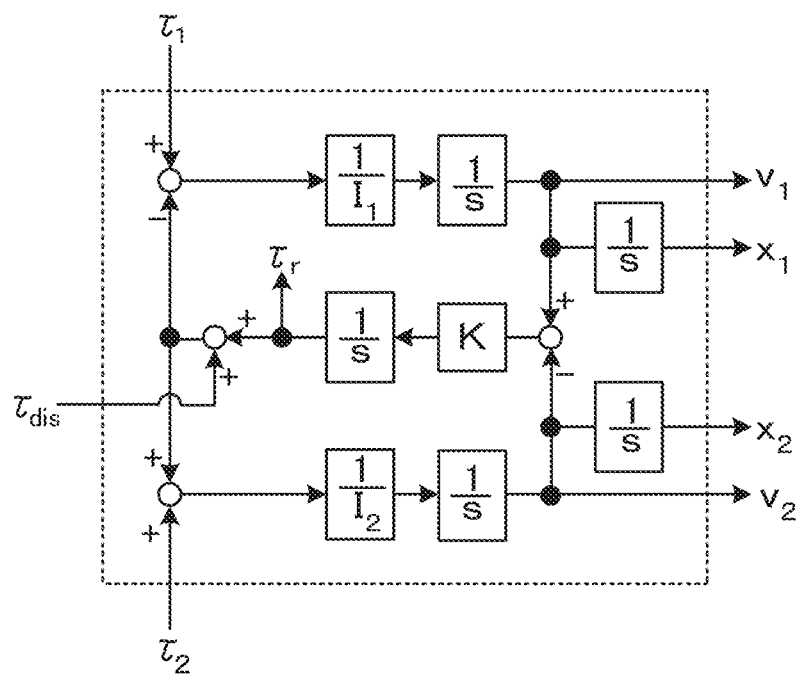
FIG. 9 is a block diagram showing an equation of motion of a target plant in the tandem control state.

Further, as it is possible to express the contents of the curly brackets of the expression (6) by an expression (7), based on the block diagram of a target plant in the tandem control state shown in FIG. 9, a relational expression (8) is obtained by substituting the expression (7) into the expression (6).

[Expression 6]

$$J \cdot sv_*(s) - \tau_*(s) = (-1)^* \{\tau_r(s) + \tau_{dis}(s)\} \tag{7}$$

[Expression 7]

$$\hat{d}_*(s) = (-1)^* \frac{L}{s+L}\{\tau_r(s) + \tau_{dis}(s)\} \tag{8}$$

wherein L is a parameter for determining an estimation upper limit band (cut-off frequency) of ˆd*, set in advance in the deflection torque estimation unit 6#.

Thereafter, using the high-pass filter 10# (cut-off frequency ωh) and the low pass filter 11# (cut-off frequency ωc) in the deflection torque estimation unit 6#, the disturbance torque τdis is removed from ˆd*, estimated based on the expression (8). Accordingly, an output of the deflection torque estimation unit 6# is expressed by an expression (9), giving an estimate ˆτr of the deflection torque τr.

[Expression 8]

$$\hat{\tau}r(s) \approx (-1)^* \tau r(s) \tag{9}$$

Further, the deflection vibration reduction torque compensator 2# applies time differentiation to the deflection torque estimate ˆτr in the differentiator 12#, and amplifies by deflection vibration reduction compensation gain CVS* times in the differentiator 13#, Cvx* being expressed as an expression (10).

[Expression 9]

$$C_{VS*} = \frac{D_p}{\hat{K}} \quad (10)$$

In the compensator gain calculation unit $3a$ to be described below, a rigidity estimate $\hat{K}$ and an amplification rate Dp of the expression (10) are determined, and the deflection vibration reduction compensation gain CVS* is calculated to be set to the deflection vibration reduction torque compensator $2\#$.

When the switch $14\#$ is turned on, an output from the amplifier $13\#$ constitutes a deflection vibration reduction torque compensation amount $\tau b^*$, or an output from the deflection vibration reduction torque compensator $2\#$. Processing of calculating a deflection vibration reduction torque compensation amount $\tau b^*$ from the deflection torque estimate $\hat{\tau}r$ is expressed as an expression (11). To express in the block diagram of a target plant in the tandem control state shown in FIG. 9, this processing approximates processing of calculating the deflection vibration reduction torque compensation amount $\tau b^*$ by multiplying the amplification rate Dp by the deflection velocity.

[Expression 10]

$$\tau_{b*} = C_{VS*} \frac{d\hat{\tau}_r}{dt} = \frac{D_p}{\hat{K}} \frac{d\hat{\tau}_r}{dt} \approx (-1)^* D_p \frac{1}{K} \frac{d\tau_r}{dt} = (-1)^* D_p (v_1 - v_2) \quad (11)$$

The deflection vibration reduction torque compensation amount $\tau b1$ is added to an output (a torque command value before compensation) of the adder unit $57a$ by an adder unit $4a$ shown in FIG. 1, thereby giving a torque command value $\tau 1$ relative to the drive shaft 1 of the position control device 1. That is, according to the position control device according to the present invention, shown in FIG. 1, it is possible to obtain a deflection vibration reduction torque compensation amount $\tau b^*$ for reducing vibration due to torque interference between shafts, similar to a conventional position control device, shown in FIG. 10, capable of real time detection of a deflection velocity, even in a structure incapable of real time detection of a deflection velocity. Note that when tandem control is not executed, the switch $14\#$ remains off, and the deflection vibration reduction torque compensator $2\#$ outputs zero.

Figure 3:
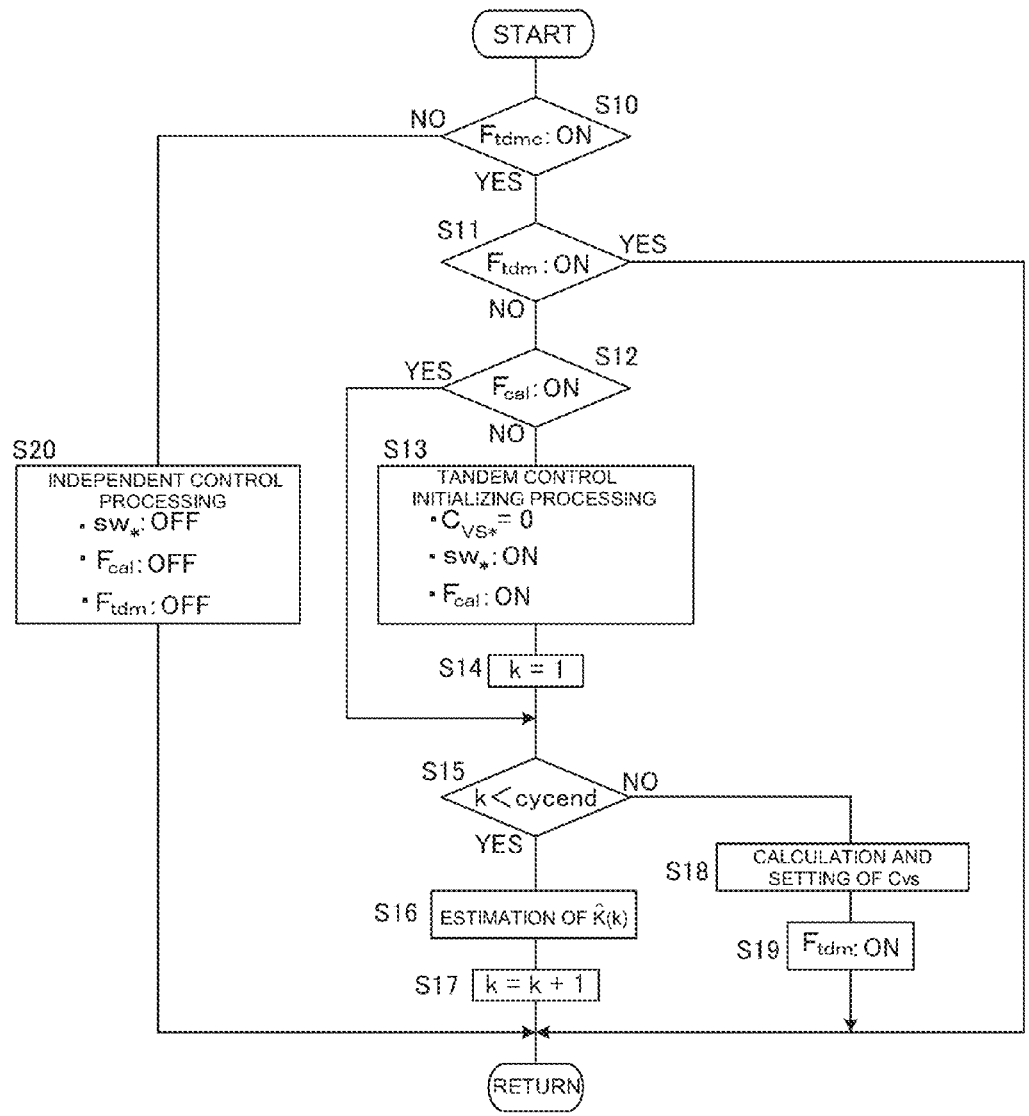
FIG. 3 is a flowchart explaining an operation of a compensator gain calculation unit provided inside a position control device according to the present invention.

In the following, an operation of the compensator gain calculation unit $3a$ shown in FIG. 1 will be described. The velocity v1 of the drive shaft 1, detected on a real time basis, is input to the compensator gain calculation unit $3a$. In addition, the velocity v1 is transferred to an upper-level device and further to the compensator gain calculation unit $3b$ of the second shaft position control unit $5b$ via the upper-level device. Meanwhile, the velocity v2 of the drive shaft 2 having a detection delay time Td is transferred from the upper-level device to the compensator gain calculation unit $3a$. FIG. 3 is a flowchart explaining an operation of the compensator gain calculation unit $3a$. Note that * in FIG. 3 indicates 1 for the compensator gain calculation unit $3a$, and 2 for the compensator gain calculation unit $3b$.

The compensator gain calculation unit $3a$ repetitively executes serial processing shown in the flowchart in FIG. 3 for every period Ts. At the time of shifting from the independent control state to the tandem control state, such as when a one main shaft positioned on the opposite side relative to the other main shaft holding one end portion of a workpiece grasps the other end portion of the workpiece, an upper-level device commands to turn on the tandem control command flag Ftdmc. Meanwhile, at the time of shifting from the tandem control state to the independent control state, an upper-level device commands to turn off the tandem control command flag Ftdmc.

Initially, the tandem control command flag Ftdmc is checked at S10. With the tandem control command flag Ftdmc in an on state, a tandem control steady state flag Ftdm is checked at S11. That is, the tandem control steady state flag Ftdm in an on state indicates completion of compensator gain calculation, and the processing is simply ended. Meanwhile, the tandem control steady state flag Ftdm in an off state indicates being in the compensator gain calculation cycle. In this case, a compensator gain calculation flag Fcal is checked at S12. As the compensator gain calculation flag Fcal in an off state indicates the initial cycle of compensator gain calculation, tandem control initializing processing is executed at S13.

In the tandem control initializing processing, the deflection vibration reduction compensation gain CVS1=0 and a switch signal SW1 in an on state are outputted to the deflection vibration reduction torque compensator $2a$ to thereby validate the tandem control structure. Further, after turning on the compensator gain calculation flag Fcal, and after the present cycle, compensator gain calculation is executed. At S14, the calculation cycle k is set to 1 before proceeding to S15. Meanwhile, when the compensator gain calculation flag Fcal is in an on state at S12, the compensator gain calculation cycle is ongoing. Thus, the processing proceeds to S15. Note that the calculation cycle end number cycend is a parameter set in advance. Processing at S16 and thereafter is executed until the calculation cycle k reaches the calculation cycle end number cycend.

At S16, a rigidity estimate $\hat{K}$ is calculated. Specifically, for every period Ts, the velocity v1(k) of the drive shaft 1 and the deflection torque estimate $\hat{\tau}r(k)$ outputted from the deflection vibration reduction torque compensator $2a$ are buffered in the memory. The velocity v2(k) of the drive shaft 2 having the detection delay time Td and transferred from an upper-level device is also buffered in the memory. The velocity v2(k) of the drive shaft 2 and the velocity v1(k) and the deflection torque estimates $\hat{\tau}r(k)$ and $\hat{\tau}r(k-1)$ at the same detection timing are selected from the buffer, and calculation of an expression (12) or (13) is executed.

[Expression 11]

$$\begin{cases} |v_1(k) - v_2(k)| > A_{lim} \text{の時} & \hat{K}_0(k) = \dfrac{\left|\dfrac{\hat{\tau}_r(k) - \hat{\tau}_r(k-1)}{T_s}\right|}{|v_1(k) - v_2(k)|} & (12) \\ |v_1(k) - v_2(k)| \leq A_{lim} \text{の時} & \hat{K}_0(k) = \hat{K}_0(k-1) & (13) \end{cases}$$

The numerator on the right side of the expression (12) is an approximation of a differential value of the deflection torque $\tau r$, and the rigidity estimate $\hat{K}0(k)$ obtained by dividing the numerator by the deflection velocity gives a calculated estimate of the rigidity K, shown in FIG. 9. The expression (13) indicates omission of the calculation when the deflection velocity $|v1(k)-v2(k)|$ is smaller than a predetermined reference value Alim as a large calculation error will result.

An expression (14) expresses filtering processing for removing a velocity detection error or an error component due to subtle discrepancy in the detection timing included in the calculation of the rigidity estimate ˆKO(k).

[Expression 12]

$$\hat{K}(k) = \hat{K}(k-1) + C_F\{\hat{K}_O(k) - \hat{K}(k-1)\} \quad (14)$$

In the expression (14), a rigidity estimate after filtering is expressed as ˆK(k), wherein CF is a filter constant set in advance in the range of 0<=CF<=1. The above described is an operation for calculating a rigidity estimate ˆK at S16. At S17, the calculation cycle k is counted up.

Figure 4:
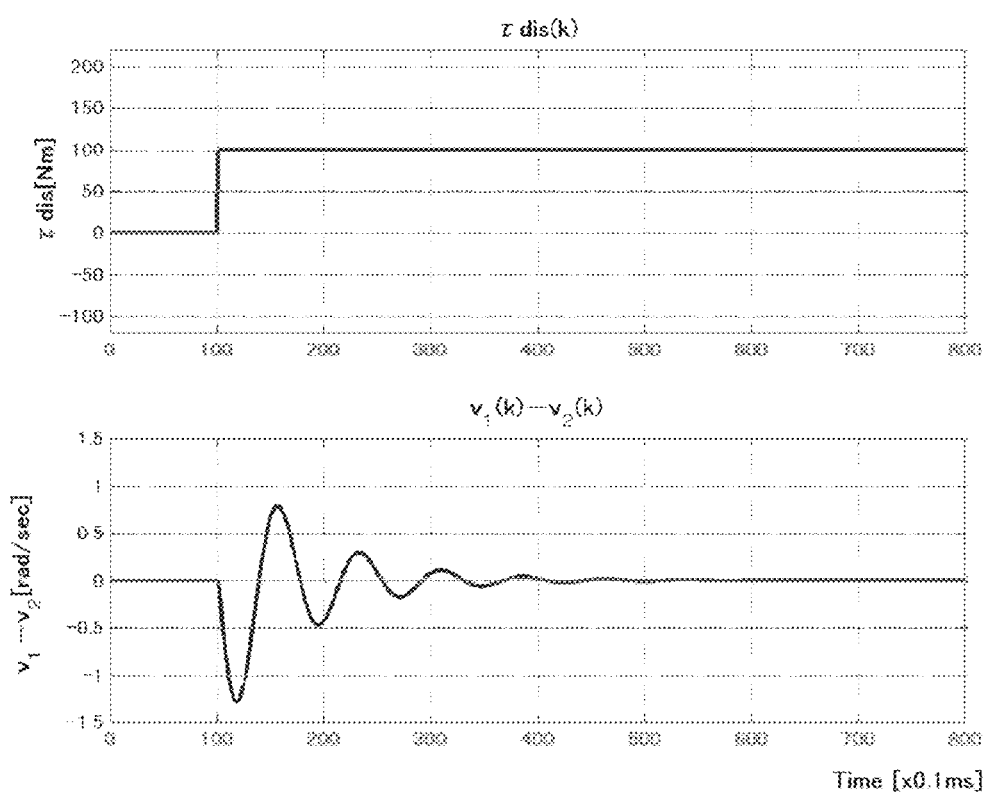
FIG. 4 shows one example of a simulation waveform of a disturbance response operation at the time of shifting to the tandem control state.
Figure 11:
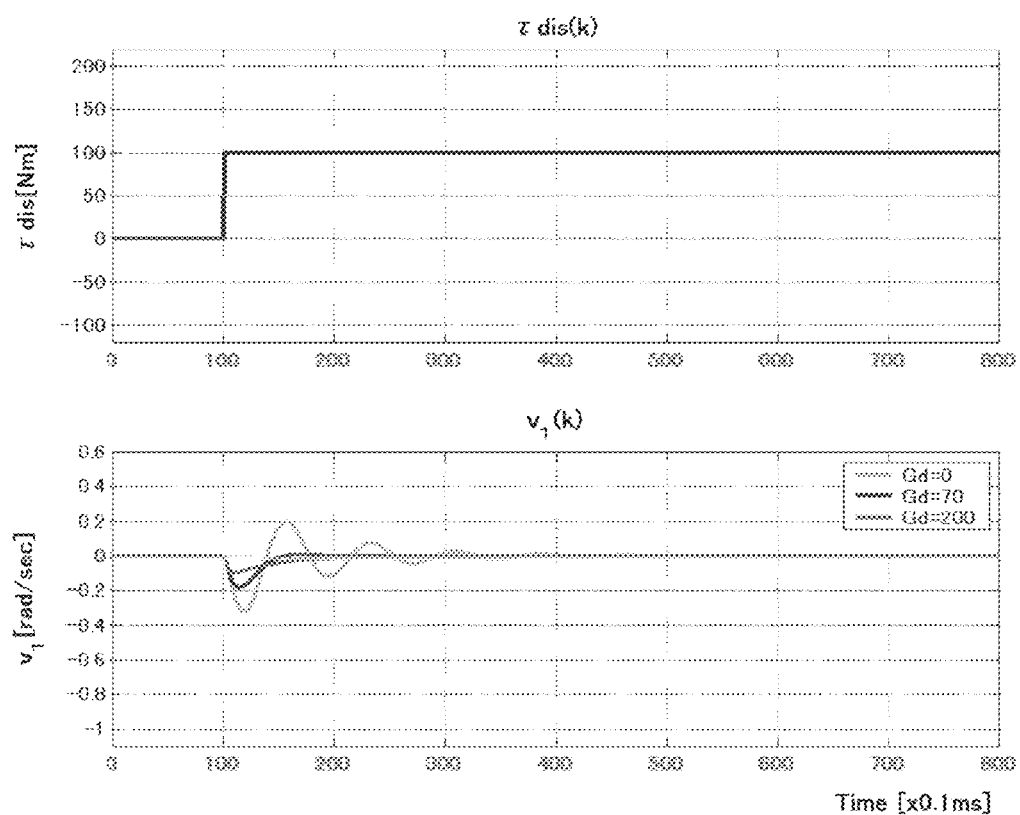
FIG. 11 shows one example of a disturbance response simulation waveform of a conventional position control device.
Figure 12:
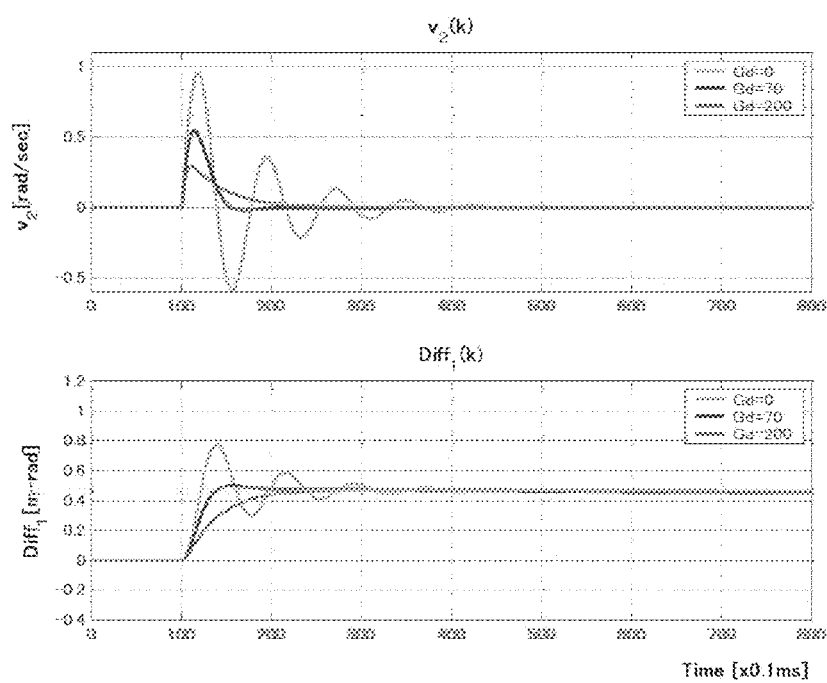
FIG. 12 shows one example of another disturbance response simulation waveform of a conventional position control device.

Below, one example of an operation for estimation calculation of a rigidity estimate ˆK will be described, referring to a simulation waveform shown in FIGS. 4 and 5. Specifically, at the time when the independent control state shifts to the tandem control state (Ftdmc off→on), such as when a one main shaft on the opposite side relative to the other main shaft holding one end portion of a workpiece grasps the other end portion of the workpiece, stepwise disturbance is resultantly applied to the respective shafts. FIG. 4 shows simulation of the deflection velocity based on an assumption that this disturbance is stepwise disturbance τdis similar to that shown in FIG. 11. Note that the target plant condition (I1, I2, K), the control condition (Kp*, Gv*, ATF*; *=1, 2), and the calculation period Ts are the same as those of the above described conventional art.

Figure 5:
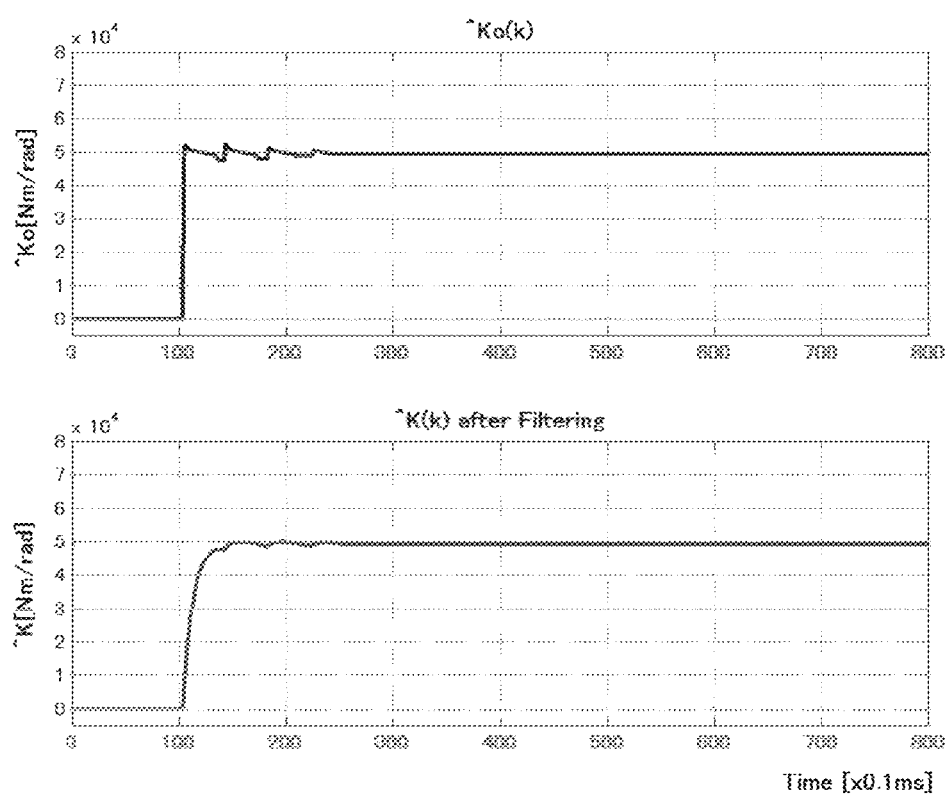
FIG. 5 shows one example of a simulation waveform of a rigidity estimation operation at the time of shifting to the tandem control state.

FIG. 5 shows simulation of an operation for calculating a rigidity estimate ˆK. The upper graph shows a result of calculation of the expression (12) or (13) for every calculation cycle with a condition of the above-described reference value Alim=0.2 [rad/s] given. Meanwhile, the lower graph shows a result of calculation with filtering processing expressed by the expression (14) executed with CF=0.1. In this example, when the calculation cycle end number cycend is set to about 400, it is possible to obtain a rigidity estimate ˆK subjected to calculation convergence.

Returning to the flowchart in FIG. 3, when the calculation cycle k reaches the calculation cycle end number cycend at S15, processing at S18 and thereafter is executed. Specifically, at S18, the deflection vibration reduction compensation gain CVS1 to be set to the amplifier 13a is calculated, based on an expression (15), using the rigidity estimate ˆK in the previous cycle.

[Expression 13]

$$C_{VS1} = \frac{D_p}{\hat{K}} \quad (15)$$

Figure 10:
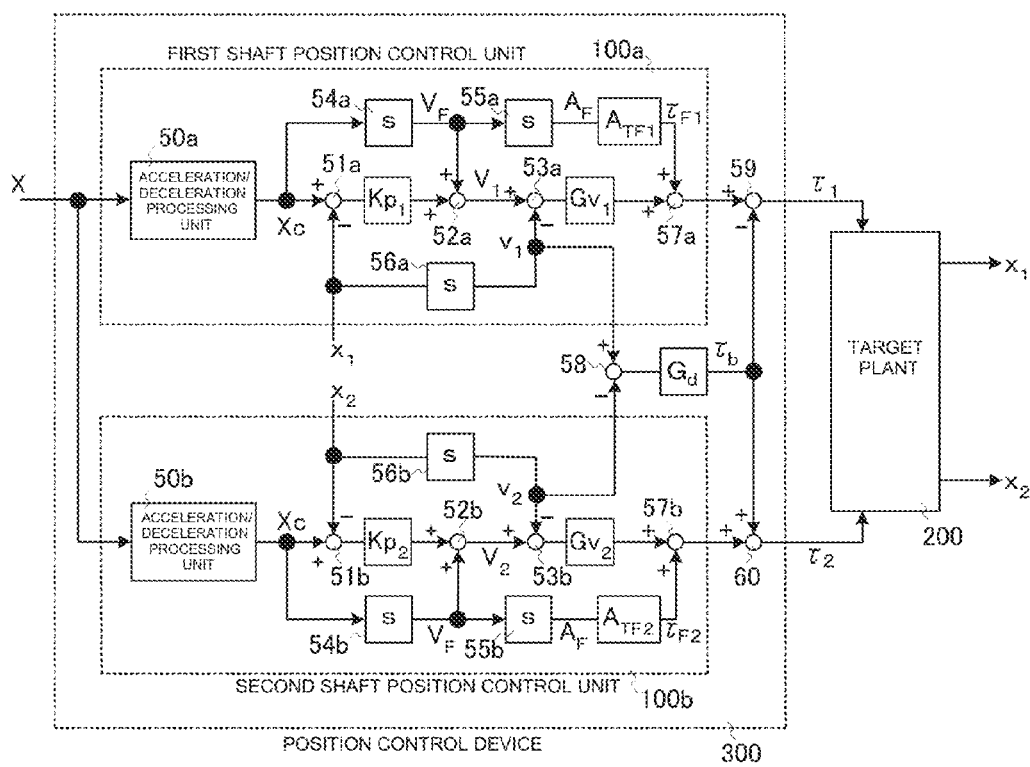
FIG. 10 is a block diagram showing an example of a structure of a conventional position control device.

Note here that as the amplification rate Dp corresponds to the amplification rate Gd in the conventional position control device shown in FIG. 10, as known from the relational expression (11), the amplification rate Dp is determined based on an expression (16) by utilizing the relationship between the expressions (5) and (4).

[Expression 14]

$$D_p = \frac{2\zeta\hat{K}}{\omega_p} = 2\zeta\sqrt{\frac{\hat{K}}{\left(\frac{1}{I_1} + \frac{1}{I_2}\right)}} \quad (16)$$

Note here that the inertia moment I1 and the inertia moment I2 are identified as to the respective shafts 1 and 2 in the independent control state, and set to the respective shafts in advance via an upper-level device. Note that an appropriate value for the attenuation coefficient ζ is set in advance.

After completion of calculation and setting of the deflection vibration reduction compensation gain CVS* at S18, the tandem control steady state flag Ftdm is turned on at S19. The compensator gain calculation unit 3a does not operate in the subsequent cycle with the tandem control command flag Ftdmc in an on state. When the tandem control state thereafter shifts to the independent control state (Ftdmc on→off), processing at the time of independent control at S20 is thereafter executed.

In the processing at the time of independent control, a switch signal SW1 in an off state is outputted to the deflection vibration reduction torque compensator 2a to thereby invalidate the tandem control structure. Further, in order to prepare for subsequent shift to the tandem control state, the compensator gain calculation flag Fcal and the tandem control steady state flag Ftdm are set off.

Figure 6:
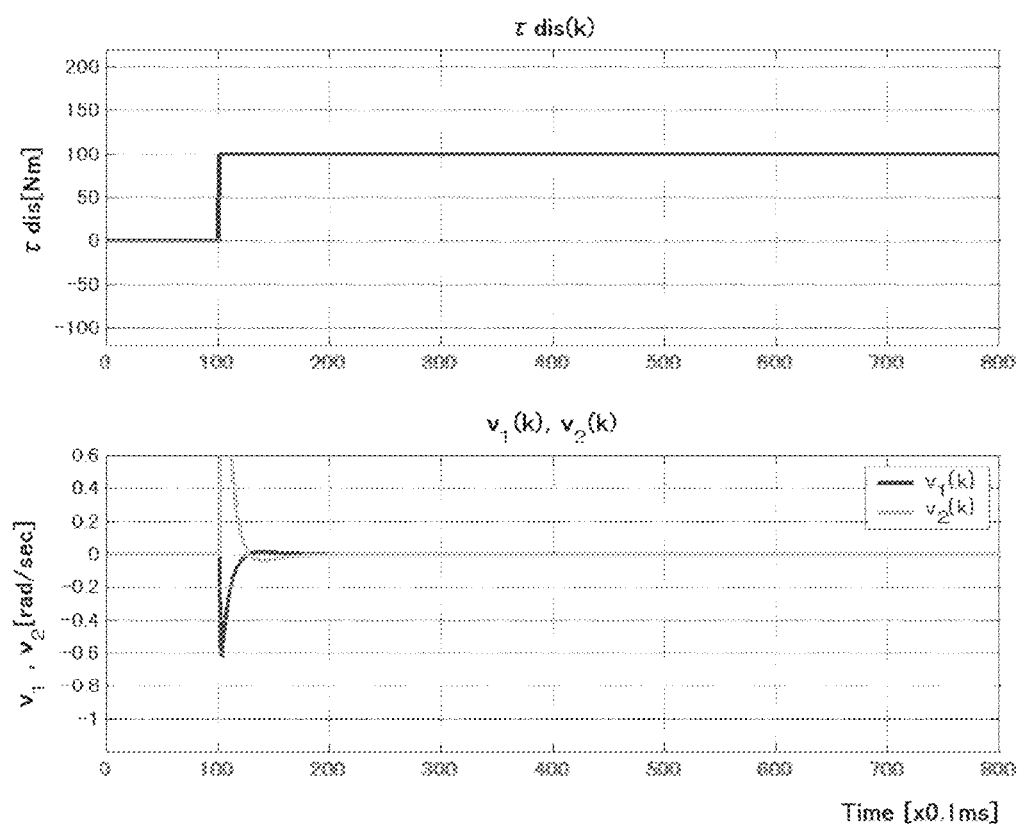
FIG. 6 shows one example of a disturbance response simulation waveform of a position control device according to the present invention in the tandem control steady state.
Figure 7:
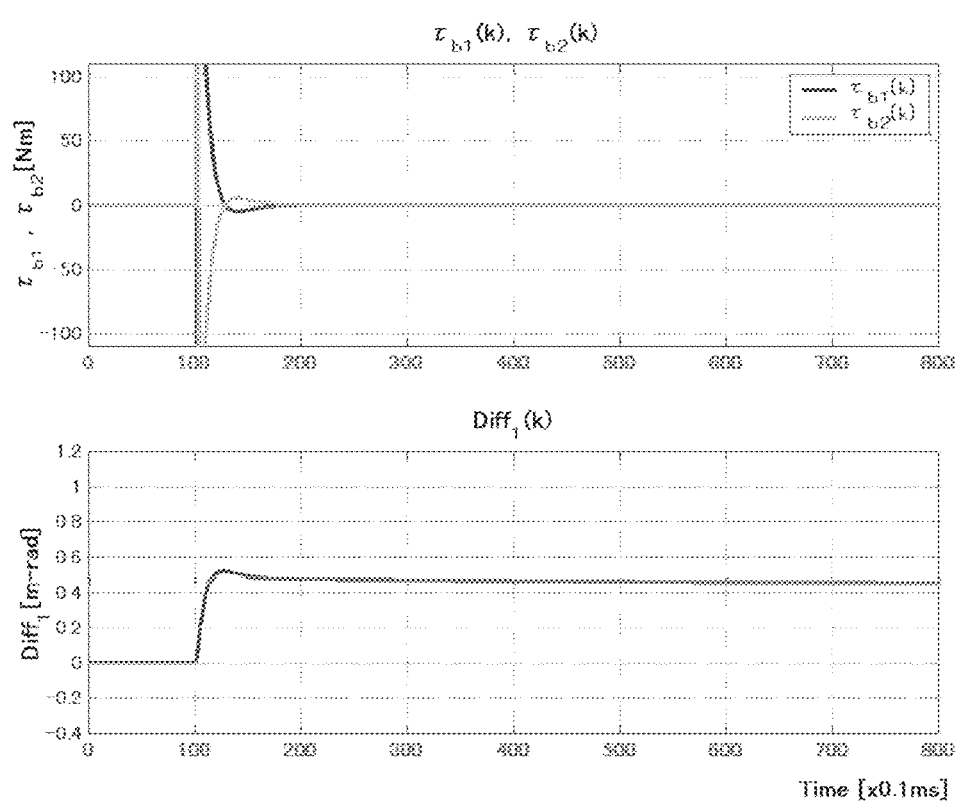
FIG. 7 shows one example of another disturbance response simulation waveform of a control device according to the present invention in the tandem control steady state.
Figure 8:
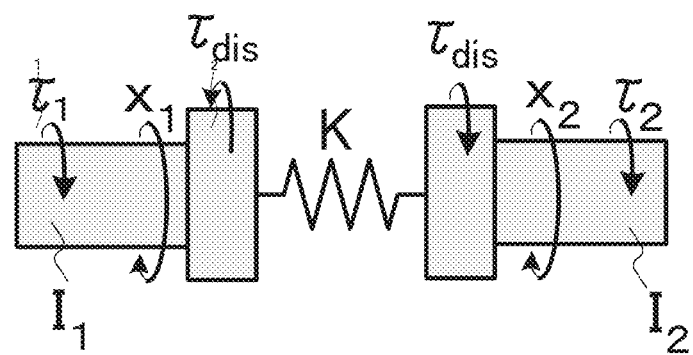
FIG. 8 is a schematic diagram explaining a target plant in the tandem control state.

In the tandem control steady state after completion of calculation and setting of the deflection vibration reduction compensation gain CVS*, the compensator gain calculation unit 3# applies a disturbance torque τdis in a stepwise manner to simulate a disturbance response for every period TS=0.1 [ms]. The result of simulation is shown in FIGS. 6 and 7. The upper graph in FIG. 6 shows a disturbance torque τdis, while the lower graph shows velocities v1 and v2 of the respective shafts generated due to the stepwise disturbance. The upper graph in FIG. 7 shows deflection vibration reduction torque compensation amounts τb1 and τb2 of the respective shafts, while the lower graph shows a position error Diff1 (=Xc−x1) of the drive shaft 1. Note that the attenuation coefficient ζ selected in determination of the amplification rate Dp in the expression (16) is ζ=0.8.

With the above, it is possible to achieve performance in the damping characteristic and response characteristic at the position error level, equivalent to that of a conventional structure that directly detects a deflection velocity. Further, as utilization of a deflection torque estimate ˆτr enables calculation for identifying a rigidity estimate ˆK, which is not possible for a conventional structure, it is possible to promptly achieve tandem control capable of torque compensation control with an appropriate attenuation coefficient ζ at the time of shifting to the tandem control state even when the independent control state and the tandem control state are repetitively switched and the target plant condition thus significantly varies.

What is claimed is:

1. A position control device employing a tandem control method for driving one control target, using two drive shafts, comprising:
   two position control units provided to the respective drive shafts, for each outputting a torque command value for a corresponding drive shaft,
   wherein each of the position control units includes;
   a calculation unit for calculating the torque command value before compensation, based on a position command value input from an upper-level device, and a detected position value of the corresponding drive shaft,
   a deflection vibration reduction torque compensator for calculating a deflection torque estimate, based on the torque command value for the corresponding drive shaft and its own shaft velocity, or a velocity of the corresponding drive shaft, and calculating a deflection vibration reduction torque compensation amount to be added to the torque command value before compensation of the corresponding drive shaft, based on the deflection torque estimate and a deflection vibration reduction compensation gain, to output the deflection vibration reduction torque compensation amount, and a compensator gain calculation unit for outputting, upon receipt of a tandem control command input from the upper-level device, to the deflection vibration reduction torque compensator, a switch signal for outputting the deflection vibration reduction torque compensation amount, calculating the deflection vibration reduction compensation gain, based on its own shaft velocity, a velocity of another shaft, and the deflection torque estimate, and outputting the deflection vibration reduction compensation gain calculated to the deflection vibration reduction torque compensator, and each of the position control units outputs a value obtained by adding the deflection vibration reduction torque compensation amount to the torque command value before compensation as the torque command value.

2. The position control device according to claim 1, wherein the compensator gain calculation unit calculates the deflection vibration reduction compensation gain, based on a rigidity estimate of a target plant, calculated based on the deflection torque estimate, its own shaft velocity, and the velocity of the other shaft, an inertia moment identified in advance with respect to each shaft, and an attenuation coefficient set in advance.

* * * * *